Johnson & Froggott,
Horseshoe.
Nº 82,528. Patented Sep. 29, 1868.

Witnesses;

Thos A Morgan
G E Cotton

Inventor;
P. C. Johnson
E. Froggott per Mmm & Co
Attorneys

UNITED STATES PATENT OFFICE.

P. C. JOHNSON AND EDWIN FROGGOTT, OF CENTRAL CITY, COLORADO.

IMPROVEMENT IN THE CONSTRUCTION OF HORSESHOES.

Specification forming part of Letters Patent No. 82,528, dated September 29, 1868.

*To all whom it may concern:*

Be it known that we, P. C. JOHNSON and EDWIN FROGGOTT, of Central City, in the Territory of Colorado, have invented a new and useful Improvement in Horseshoes; and we do hereby declare that the following is a full, clear, and exact description thereof, which will enable others skilled in the art to make and use the same, reference being had to the accompanying drawings, forming part of this specification, in which—

Figure 1:
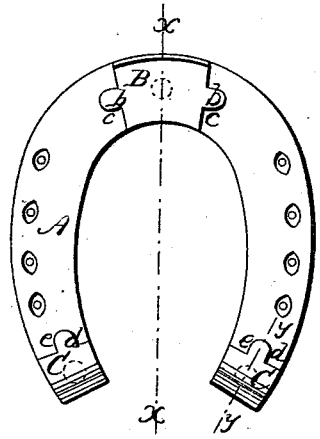
Figure 2:
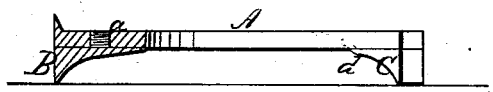
Figure 3:
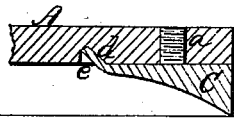

Figure 1 is a view of the under side of a horseshoe having calks attached according to our invention. Fig. 2 is a section of the same, taken in the line $x\ x$, Fig. 1. Fig. 3 is a section of a portion of the same, taken in the line $y\ y$, Fig. 1.

Similar letters of reference indicate like parts.

This invention relates to a new and improved mode of securing calks to horseshoes, whereby the former may be very readily applied to and detached from the latter, and a horseshoe always kept supplied with proper calks without the aid of a smith.

In the accompanying sheet of drawings, A represents a horseshoe which is constructed in the usual form, but having a smooth under surface—that is to say, has neither toe nor heelcalks formed on it.

The calks are made separately. B is the toe-calk and C C the heel-calks. These may be constructed in the usual or any proper shape; but each has a screw, $a$, secured in its upper surface, and of sufficient length to pass entirely through the shoe and be flush with the upper surface thereof.

The toe-calk B is provided at each side with an arm, $b$, of sufficient length to admit, after the calk is screwed to the bottom of the shoe, of being bent down and fitted in holes $c\ c$ in the under side of the shoe. The heel-calks C C are provided each with an arm, $d$, projecting from their front ends, and these arms, when the calks are screwed to the bottom of the shoe, are bent down and fitted in holes $e\ e$, made in the under side of the same. (See more particularly Fig. 3.)

The arms of the calks bent down into holes in the shoe prevent the calks from casually unscrewing or turning; and it will be seen that the calks, when worn by use, may be readily detached and replaced by new ones.

We are aware that the use of screws for attaching removable calks to horseshoes is not new, and we therefore do not claim them; but, Having described our invention, we claim as new and desire to secure by Letters Patent—

The arms $b\ d$, attached to or formed with the calks, and bent down into holes in the bottom or under side of the shoe to form a locking device, in combination with the screws $a$, substantially as shown and described.

P. C. JOHNSON.
EDWIN FROGGOTT.

Witnesses:
S. P. KENDALL,
W. F. SEARS.